(12) United States Patent
Nassi et al.

(10) Patent No.: US 6,844,490 B2
(45) Date of Patent: Jan. 18, 2005

(54) SUPERCONDUCTING CABLE (75) Inventors: Marco Nassi, Turin (IT); Pierluigi Ladie', Milan (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 79 days.

(21) Appl. No.: 09/885,940

(22) Filed: Jun. 22, 2001

(65) Prior Publication Data

US 2002/0035039 A1 Mar. 21, 2002

Related U.S. Application Data (63) Continuation of application No. PCT/EP99/10443, filed on Dec. 22, 1999.
(60) Provisional application No. 60/114,546, filed on Dec. 31, 1998.

(30) Foreign Application Priority Data

Dec. 24, 1998 (EP) .......................................... 98204401

(51) Int. Cl.$^7$ .......................... H01B 12/00; H01R 4/68; H02G 15/34
(52) U.S. Cl. .................... 174/15.5; 174/125.1; 505/230
(58) Field of Search .............................. 174/15.4–15.5, 174/125.1; 505/230–232

(56) References Cited

U.S. PATENT DOCUMENTS

| | | | | |
|---|---|---|---|---|
| 3,595,982 A | * | 7/1971 | Kafka ........................ | 174/15.5 |
| 3,904,809 A | * | 9/1975 | Penczynski ................... | 174/27 |
| 4,184,042 A | * | 1/1980 | Vulis et al. ................. | 174/15.5 |
| 4,336,420 A | * | 6/1982 | Benz ........................ | 174/125.1 |
| 6,255,595 B1 | * | 7/2001 | Metra et al. ............. | 174/125.1 |
| 6,262,375 B1 | * | 7/2001 | Engelhardt et al. ...... | 174/125.1 |

FOREIGN PATENT DOCUMENTS

| | | |
|---|---|---|
| EP | 2 122 741 | 9/1972 |
| EP | 0 786 783 A1 | 7/1997 |
| WO | 99/08289 | 2/1999 |

OTHER PUBLICATIONS

E. W. Collings, "Conductor Design with High–Tc Ceramics, A Review, " $2^{nd}$ Int'l. Symposium on Superconductivity, (Japan), 8 pages, (Nov. 1989).
E. W. Collings, "Flux–Jump Stability and Cryostability in Ceramic Superconductors for 80K", MRS Intl'l. Mtg. on Adv. Mats., vol. 6, pp. 155–160, (1989).
Ito et al., "Maddock Criterion and Minimum Propagating Zone", Cryogenics, vol. 29, pp. 621–624 (1989).
T. Hara et al., "Feasibility Study of Compact High–Tc Superconducting Cables, " IEEE Transactions on Power Delivery, vol. 7, No. 4, pp. 1745–1753, (1992).

* cited by examiner

Primary Examiner—David A. Zaineke
Assistant Examiner—Jeremy Norris
(74) Attorney, Agent, or Firm—Finnegan, Henderson, Farabow, Garrett & Dunner, L.L.P.

(57) ABSTRACT

A superconducting cable having at least one phase and having: a) a layer of tapes of superconducting material; b) a tubular element of superconducting material for supporting said layer of tapes, said tubular element having at least one portion made of metallic material, and being in electrical contact with the layer of tapes of superconducting material; c) a cooling circuit adapted to cool the superconducting material to a working temperature not higher than its critical temperature, having a fluid at a predetermined working pressure ranging between a minimum value and a maximum value; wherein the deformation of said tapes of superconducting material, consequent to a temperature variation between the room temperature and the working temperature of the cable is lower than the critical deformation of the same tapes. A predetermined amount of conductive material of resistive type in electrical contact with the layer of superconducting material is present, such that the maximum temperature reached by the superconducting material in case of short circuit is lower than the minimum temperature between the critical temperature of the superconducting material and the boiling temperature of said cooling fluid at the minimum working pressure of said fluid.

16 Claims, 4 Drawing Sheets

SUPERCONDUCTING CABLE

CROSS REFERENCE TO RELATED APPLICATIONS

The application is a continuation of International Application No. PCT/EP99/10443, filed Dec. 22, 1999, which is incorporated by reference herein, and claims the priority of EP98204401.8, filed Dec. 24, 1998, and the benefit of U.S. Provisional application No. 60/114,546, filed Dec. 31, 1998, which is incorporated by reference herein.

FIELD OF INVENTION

In a general aspect thereof, the present invention relates to a cable to be used to transmit electric current in conditions of so-called superconductivity, i.e. in conditions of almost null electric resistance.

More particularly, the invention relates to a superconducting cable (1) having at least one phase comprising:

a) a layer (20) of tapes comprising superconducting material, b) a tubular element (6) for supporting said layer (20) of tapes comprising superconducting material, said tubular element comprising at least one portion made of metallic material, and being in electrical contact with the (20) layer of tapes comprising superconducting material;

c) a cooling circuit adapted to cool the superconducting material to a working temperature non higher than its critical temperature, comprising a fluid at a predetermined working pressure ranging between a minimum value and a maximum value;

wherein the deformation of said tapes comprising superconducting material, consequent to a temperature variation between the room temperature and the working temperature of the cable is lower than the critical deformation of the same tapes.

In the following description and the subsequent claims, the term: superconducting material, indicates a material, such as for instance special niobium-titanium alloys or ceramics based on mixed oxides of copper, barium and yttrium, or of bismuth, lead, strontium, calcium, copper, thallium and mercury, comprising a superconducting phase having a substantially null resistivity under a given temperature, defined as critical temperature (in the following also shortly referred to as Tc).

The term: superconducting cable, indicates a cable to be used to transmit electric current comprising at least one conductive element including a layer of superconducting material.

The term: conventional or resistive cable, or conducting material of resistive type, indicates a cable comprising non superconducting conducting material, i.e. employing electrical conductive elements having non null resistance.

Finally, in the following description and in the subsequent claims, the term: cable for high power, indicates a cable to be used for transmitting current quantities generally exceeding 3,000 A, such that the induced magnetic field starts to reduce the value of the maximum current density achievable in superconductivity conditions.

PRIOR ART

In the field of superconducting cables the problem of protecting the cable from the short circuit overcurrent, thus assuring that whenever a short circuit occurs the superconducting material is maintained in conditions of superconductivity and, that is to say, below its critical temperature, is particularly felt.

The prior art suggests to face this problem by proposing a series of stability criteria having as common base that of maintaining the cable below its critical temperature after the short circuit transient.

An overview of the stability criteria of superconducting cables is, in particular, carried out by E. W. Collings, "Flux-jump stability and cryostability in ceramic superconductors for 80 K", MRS Int'l. Mtg. on Adv. Mats. Vol. 6, 1989 Material Research Society, and "Conductor Design with High-Tc ceramic—a review", $2^{nd}$ Int. Symposium on Superconductivity, November 1989, Japan.

In such publications a distinction is made between cryostability criteria and "flux-jump stability", with the intention of indicating with this term the stabilization of the superconducting cable after flux peaks occurring therein.

In particular, the cryostability criteria disclosed in the above indicated publications are in their turn distinguished in full or limited stability whenever an adequately cooled normal conducting material is associated to the superconducting one, which allows to recover the superconducting state after the overcurrent has brought the superconducting material to the normal state for its whole length or for a limited length thereof, respectively.

Such criteria of full and limited cryostability have as common base that of using a predetermined amount of metallic material in the cable, having the function of normal conductor during the short circuit transient and suitable both for allowing the passage therethrough of the short circuit overcurrent, and for eliminating the heat generated during the short circuit itself limiting the temperature increase in the superconducting material in such a way as to remain below its critical temperature.

In fact, during the short circuit the superconducting material looses its superconducting abilities and becomes a bad electricity conductor so that the overcurrent passes through the normal conductor. Such a current transport carried out by the normal conductor implies an energy dissipation within the conductor itself that—in the presence of a satisfactory amount of metal—allows the superconducting material to return to its superconducting state, once the short circuit transient is come to an end.

In the above mentioned publications, besides the criteria of full and limited stability, criteria of dynamic and adiabatic stability are also described. A further criterion of cryostability, described in the second of the above mentioned publications and in T. Ito and H. Kutoba, Cryogenics 29, 621–624 (1989), is the so called criterion of stability related to the minimal propagation zone (MPZ). Also such criterion provides for the association of a normal conductor to the superconducting material and allows at the stabilization of the superconducting cable with respect to the conductivity along a longitudinal direction of the materials.

The above described stability criteria may also be applied to the superconducting cables alone or in combination with one another.

Patent application EP97202433.5 in the name of the Applicant discloses superconducting tapes, which are coupled to metallic foils, having a maximum tensile deformation greater than 3%.

The Applicant has noticed that the application of the criterion of full and adiabatic stability to the superconducting cables and above all to those in which high temperature superconducting materials are employed, implies a series of drawbacks. In fact, in order to fully comply with that stability criterion it is necessary to use a remarkable amount of metallic material (normal conductor) with an ensuing series of drawbacks which are correlated on the one hand to the high weight and volume of the cable which render troublesome the manufacture thereof, limit its maximum length and render more difficult its installation, and, on the other hand, to the high overall cost of the cable which follows.

Furthermore, the Applicant perceived that the use of a metallic material as supporting element for the superconducting material causes the set up of stresses which tend to deform the superconducting material during the cable cooling because of the different thermal expansion coefficient of the metal used with respect to that of the superconducting material itself.

In fact, the Applicant has found that during the cable cooling from the room temperature to the temperature of the cooling fluid employed (for example liquid nitrogen) in the working arrangement with clamped heads, the elements which constitute the superconducting cable are submitted to a numbers of stresses, both in radial direction (because of the different coefficients of thermal expansion of the materials which constitute the same) and in longitudinal direction (because of the clamped heads arrangement) that risk to damage the superconducting material.

In this respect, particularly harmful are the stresses that are generated along a longitudinal direction on the layer of superconducting material, because they may cause the occurrence of superficial cracks that would affect its ability to transport current in conditions of superconductivity.

According to its first aspect the invention relates to a superconducting cable of the above indicated type which is characterized in that a predetermined amount of conducting material of resistive type in electrical contact with the layer (20) of superconducting material is present, such that the maximum temperature reached by the superconducting material in case of short circuit is lower than the minimum temperature between the critical temperature of the superconducting material and the boiling temperature of said cooling fluid at the minimum working pressure of said fluid.

Preferably, the amount of metallic material in electrical contact with said layer and in particular the amount present in the supporting element of the layer of superconducting material is determined by applying the criterion of full and adiabatic stability reported in the following description.

According to the invention, it is possible to reduce the longitudinal stresses which are generated in the superconducting material during its cooling because of the impossibility of a free shrinkage, hence limiting the occurrence of a damage of the superconducting material and accordingly limiting the decrease of its transmission ability in conditions of superconductivity.

In a second aspect thereof, the invention relates to a conductive element for superconducting cables comprising at least one layer of superconducting material incorporated within a metallic coating, supported by a tubular element comprising a predetermined amount of metallic material with which the same is in electrical contact, said layer of superconducting material is cooled by means of a cooling fluid to a temperature not higher than its critical temperature, characterized in that a predetermined amount of conducting material of resistive type is present in electrical contact with the layer of superconducting material, such that the maximum temperature reached by the superconducting material in case of short circuit is lower than the minimum temperature between the critical temperature of the superconducting material and the boiling temperature of said cooling fluid at the minimum working pressure of said fluid.

In a third aspect thereof, the present invention relates to a method for limiting the stresses induced along a longitudinal direction in a tape of superconducting material of a superconducting cable comprising the steps of:

providing at least one tubular element for supporting a tape of superconducting material comprising a predetermined amount of metallic material, said tubular element being in electrical contact, with a tape of superconducting material, spirally winding said tape of superconducting material onto the surface of said at least one supporting tubular element, cooling the superconducting material to a temperature not higher than its critical temperature by means of a cooling fluid, characterized in that it comprises the steps of:

coupling at least one reinforcing foil made of metallic material coupled to said tape of superconducting material, determining the total amount of metallic material in electrical contact with the layer of superconducting material in such a way that the maximum temperature reached by the superconducting material in case of short circuit is lower than the minimum temperature between the critical temperature of the superconducting material and the boiling temperature of said cooling fluid at the minimum working pressure of said fluid.

According to a first embodiment of the present invention, the deformation of said tapes comprising superconducting material, consequent to a temperature variation between room temperature and the working temperature of the cable is lower than the critical deformation of the same tapes, due to the provision of means adapted to limit the induced stresses along a longitudinal direction in the layer of superconducting material which comprises at least one reinforcing foil of metallic material coupled, preferably in a substantially irreversible way, to the metallic coating of the superconducting tape and in electrical connection with the superconducting material.

In this way, during the short circuit transient, the overcurrent is split up between the metallic material of the tape, the metallic material of the supporting tubular element and the reinforcing foil, electrically connected in parallel to the superconducting material and constituting a resistive type conductor, by-passing the latter. At the end of the short circuit transient, the current may be transported again by the superconducting material in superconductivity conditions.

In particular, in the conductive element the electrical connection of the metallic material of the tape with the metallic material of the supporting tubular element on the one hand, and with the reinforcing foil on the other hand, is made either placing the aforesaid materials in direct contact with one another or interposing between them conductive elements known per se.

Preferably, the reinforcing foil has a thickness not higher than half of the thickness of the metallic coating and advantageously contributes to increase the resistance of the conductive element of the cable at the various mechanical or thermal stresses, imparted thereto during installation or use.

Still more preferably, such thickness is comprised between 0.03 and 0.08 mm.

In a preferred embodiment of the invention, the resistance of the conductive element of the cable to the various stresses imparted thereto may be advantageously further increased submitting the superconducting material to a predetermined prestress degree along a longitudinal direction.

Such a prestress is preferably obtained by coupling the reinforcing foil to the coating material of the tape of superconducting material, while simultaneously applying to the foil a tensile stress substantially oriented along a longitudinal direction.

Advantageously, it has been found that such a prestress of the superconducting material is able to partially compensate the tensile effect applied on the superconducting material in the clamped heads arrangement of the cable when the latter is cooled from room temperature to the temperature of the cooling fluid.

More particularly, the Applicant has found a smaller decrease in the transport capacities in conditions of superconductivity of the superconducting material used in the cable than a superconducting cable provided with tapes which are not provided with such reinforcing foil when using the same material (and hence the coefficients of thermal expansion), the same geometry of the cable and the same temperature reduction during cooling.

Preferably a conductive element provided with reinforced tapes of the above mentioned type is obtained by applying a tensile stress comprised between $3.4*10^7$ Pa ($3.5$ kg/mm$^2$) and $34.3*10^7$ Pa ($35$ kg/mm$^2$) to the reinforcing foil by means of apparatuses known per se, such as for example by means of two coils, one for winding and the other for unwinding, of which one is suitably braked.

Due to such tensile stress, the superconducting material of the reinforced tapes so obtained has a % prestress degree along a longitudinal direction or "γ", defined as follows:

$$\gamma=[(L_i-L_f)/L_i]*100$$

wherein:

$L_i$=initial length of the tape;

$L_f$=final length of the tape after prestress;

comprised between 0.05 and 0.2%.

In an alternative embodiment, the means adapted to limit the induced stresses along a longitudinal direction in the layer of superconducting material may comprise two reinforcing foils coupled to opposite faces of the metallic coating.

Preferably, the reinforcing foil and the metallic coating are reciprocally coupled in a substantially irreversible way by means of welding or brazing and in such a way as to guarantee that the desired prestress of the superconducting material be maintained once the coupling is made.

Advantageously, the desired electrical contact between the reinforcing foil and the metallic coating of the superconducting material is automatically ensured in case of coupling by means of welding or brazing.

Advantageously, the cable of the invention comprises a plurality of superconducting tapes spirally wound on the surface of the supporting tubular element according to a winding angle comprised between 5° and 60°, and preferably between 10° and 40°. In such a way, it is advantageously possible to further reduce possible mechanical stresses generated inside each of the aforesaid tapes.

Preferably, the reinforcing foil or foils and the metallic coating of said at least one superconducting tape consist of a metal selected from the group comprising: copper, aluminum, silver, magnesium, nickel, bronze, stainless steel, beryllium and alloys thereof.

Still more preferably, the reinforcing foil or foils coupled to the metallic coating of the superconducting tape or tapes consist of a metal selected from the group comprising: stainless steel, preferably amagnetic, bronze, beryllium, aluminum, and alloys thereof, whereas the metallic coating of the tapes consists of a metal selected from the group comprising: silver, magnesium, aluminum, nickel, and alloys thereof.

According to a second embodiment of the present invention, the means adapted to limit the induced stresses along a longitudinal direction in the layer of superconducting material comprises the aforesaid supporting tubular element which in this embodiment is or a substantially composite type, that is comprising a first metallic material and a second material associated to said first material and having a thermal expansion coefficient higher than that of said first material.

Advantageously, the supporting tubular element simultaneously acts as a means adapted to limit the induced stresses along a longitudinal direction in the layer of superconducting material and as a means adapted to mechanically support the superconducting material, providing at the same time a metal quantity, in electrical connection with the superconducting material, that is sufficient for stabilizing the cable during the short circuit transient.

The Applicant has indeed found that the use of a substantially composite supporting tubular element and not exclusively consisting of metallic material, allows to reduce the stresses imparted to the superconducting material both in radial direction and along a longitudinal direction.

In particular, it has been found that such composite supporting tubular element, thanks to the presence of the above indicated second material having a higher thermal expansion coefficient, has an overall thermal expansion coefficient higher than that of the superconducting material, and therefore during the cooling step of the cable is able to shrink in radial direction to a greater extent with respect to entirely metallic supports.

In this way, the composite support according to the invention allows the superconducting material to shrink itself to a greater extend along a longitudinal direction and, hence, allows to reduce the stresses along a longitudinal direction inside the superconducting material due to the so-called constrained shrinking.

Additionally, the use of a composite supporting tubular element advantageously allows to reduce in a substantial way also the stresses exerted along a longitudinal direction by the ends of the superconducting cable on the terminals with respect to the tubular elements entirely made of metal whenever the second material of the composite supporting tubular element also has a Young's modulus (E) lower than that of the first metallic material.

The longitudinal stresses to which the cable is submitted in operation, in fact, are proportional to the product of the thermal expansion coefficient and the respective Young's modulus (E) of the material which constitutes the supporting tubular element.

Additionally, it has been observed that by means of a suitable sizing, the composite supporting tubular element comprises an amount of metallic material, acting as normal conductor and in electrical connection with the superconducting material, that is sufficient for stabilizing the cable during the short circuit transient. In particular, during the short circuit transient, the overcurrent, which cannot be transported by the superconducting material, which has temporarily lost its characteristics of superconductivity, passes through the metallic material in electrical connection with the superconducting material.

For the purposes of the invention, the first metallic material for the manufacture of the composite supporting element is a metal preferably having a resistivity at 77 K<$5*10^{-9}$ Ωm, a specific heat at 77 K>$10^6$ J/m$^3$K and a heat conductivity at 77 K>5 W/mK.

In particular, the first metallic material of the composite supporting element is selected from the group comprising: copper, aluminum and alloys thereof.

Preferably, the aforesaid second material is a non metallic material and has a thermal expansion coefficient higher than $17*10^{-6}$ ° C.$^{-1}$, preferably higher than $20*10^{-6}$ ° C.$^{-1}$, and still more preferably comprised between 40 and $60*10^{-6}$ ° C.$^{-1}$.

In a preferred embodiment, the aforesaid second non metallic material is a plastics material.

For the purposes of the invention, the plastics material is preferably selected from the group comprising: polyamide, such as for example nylon, polytetrafluoroethylene (PTFE), polyethylene.

The values of the percent thermal shrinkage ($\epsilon$) between the room temperature and 77 K and of the Young's modulus (E) at 77 K of some materials provided for use when manufacturing the composite supporting element according to the invention, are indicated in the following table.

| Material | $\epsilon$ (%) | E (GPa) |
| --- | --- | --- |
| Cu | 0.30 | 100 |
| Al | 0.39 | 77 |
| Ag | 0.36 | 100 |
| PTFE | 2.00 | 5 |

In an advantageous embodiment, the aforesaid first and second materials are formed as adjacent annular sectors. Such design allows, in particular, to facilitate the step of manufacturing the composite tubular element.

For the purposes of the invention, the number of sectors of said first and second material and the arrangement of such sectors may be easily determined by a man skilled in the art on the basis of the construction requirements of the cable.

Preferably, the number of sectors for manufacturing a composite supporting tubular element is comprised between 3 and 50. In a preferred embodiment, such number is chosen as a function of the outer diameter of the composite supporting tubular element and of the thickness of the sectors in such a way that the ratio "K" between the thickness "s" of the sector and its width "l" is comprised between 0,4 and 0,7.

Preferably, the sectors of said first and second material are alternately arranged one after the other. Such arrangement allows in fact to make a supporting tubular element having relatively homogeneous mechanical characteristics which allow to guarantee both a satisfactory dynamic stability of the stranding machine used for manufacturing the supporting tubular element, and the mechanical congruence of the composite supporting tubular element as a whole during the cooling of the cable Preferably, the annular sectors of said first and second material are spirally wound with a winding angle comprised between 5° and 50°. In such a way, it is possible to ensure a satisfactory and lasting clamping between adjacent sectors.

In an alternative embodiment, the composite supporting tubular element of the superconducting material may comprise an inner tubular element essentially consisting of said second material onto which thin foils or wires essentially consisting of said first metallic material are wound.

Also in this case and as explained above, the foils or the wires may be advantageously spirally wound on the inner tubular element.

According to a third embodiment of the invention, the means adapted to limit the induced stresses along a longitudinal direction in the layer of superconducting material comprises the above described composite tubular element and at least one metallic reinforcing foil coupled to the tape or tapes of superconducting material.

The superconducting cable of the invention may be both a coaxial and a non-coaxial cable.

In the following description and in the subsequent claims, the term: coaxial cable, indicates a cable comprising a supporting tubular element, a phase conductor coaxially surrounding the supporting tubular element, a layer of dielectric material external to the phase conductor and a return conductor supported by the layer of dielectric material and coaxial to the phase conductor.

For the purposes of the invention, inside the return conductor a current flows which is equal and opposite to that circulating inside the phase conductor, so as to generate a magnetic field equal and opposite to that generated by the current circulating in the phase conductor, so as to confine the magnetic field in the portion of the cable comprised between the two conductors and reduce the presence of dissipative currents in the cable portions externally supported with respect to the return conductor.

Preferably, the return conductor comprises at least one superconducting tape including a layer of superconducting material incorporated within a metallic coating and a predetermined amount of metallic material (stabilizing metal) in electrical contact with the metallic coating and having the function of allowing the stabilization of the superconducting material in conditions of short circuit.

Preferably, besides, the overall amount of the stabilizing metal is determined by applying the same criterion of full and adiabatic stability which is applied for the phase conductor and which will be reported in the following description.

Preferably, the stabilizing metal is split up in a plurality of straps or tapes, having a thickness comprised between 0.1 and 5 mm, in direct contact with the metallic coating of the superconducting tape, for example wound thereon.

In an alternative embodiment, the return conductor may a comprise at least one metallic reinforcing foil coupled, preferably in a substantially irreversible way, to the metallic coating of the superconducting material and interposed between the latter and the stabilizing metal.

Similarly to what happens to the phase conductor, the return conductor looses its conductive capacities during the short circuit transient and the current passes through the stabilizing metallic material, the reinforcing foil (if present) and the metallic coating of the tapes (if present), to flow back in the superconducting material at the end of the short circuit.

Suitably, the stabilizing metal of the return conductor, may be split up in straps or wires, for example of copper or other suitable metal, associated to the superconducting tapes and, as such, also being spirally wound as the same tapes.

Preferably, the superconducting cable of the invention is cooled by means of a suitable pressurized and undercooled cooling fluid, in such a way as to ensure the heat exchange necessary for the operation of the cable and guarantee that a temperature suitably lower than the critical temperature of the superconducting material is maintained, also for high lengths of the cable.

During its flowpath, in fact, the cooling fluid is simultaneously subjected both to an increasing heating, as a result of the heat absorbed by the elements which constitute the cable, and to an increasing loss of pressure, due to the hydraulic losses while passing through the cable and to the more or less turbulent flow of the cooling fluid itself.

The choice of the working conditions of the cable is therefore made taking such phenomena into account. In particular, working conditions are preferred which maintain the cooling fluid as far away as possible from the temperature and pressure values of its own curve of saturation. Such working conditions are comprised inside the so called "working window" which delimits a portion in the state diagram of the cooling fluid inside which safety conditions exist with respect to the need of cooling the superconducting material below its critical temperature while maintaining the cooling fluid in liquid state.

Advantageously, the use of pressurized and undercooled cooling fluid allows, furthermore, to reduce the amount of metallic material employed as stabilizing metal. The more the cooling fluid is pressurized and undercooled, the smaller is the amount of metal employed.

Preferably, the superconducting material is of the so called "high temperature" type (Tc of about 110 K) and is cooled to a temperature comprised between about 63 K and 90 K.

Such cooling is preferably achieved using liquid nitrogen as cooling fluid at a working pressure comprised between 10 and 20 bar.

According to the invention, the embodiments of the previously described superconducting cable may be various. In particular and as illustrated above, the cable of the invention may be coaxial or non-coaxial, the phase or the three existing phases may be monoelement or multielement, the electrical insulation may be both in cryogenic environment (cold dielectric) or at room temperature (warm dielectric), the thermal insulation may be made on each single phase or on three joined phases.

BRIEF DESCRIPTION OF THE DRAWINGS

Further characteristics and advantages of the present invention will appear more clearly from the following detailed description of some preferred embodiments, made hereinbelow, with reference to the attached drawings. In the drawings.

DETAILED DESCRIPTION OF PREFERRED EMBODIMENTS

Figure 1:
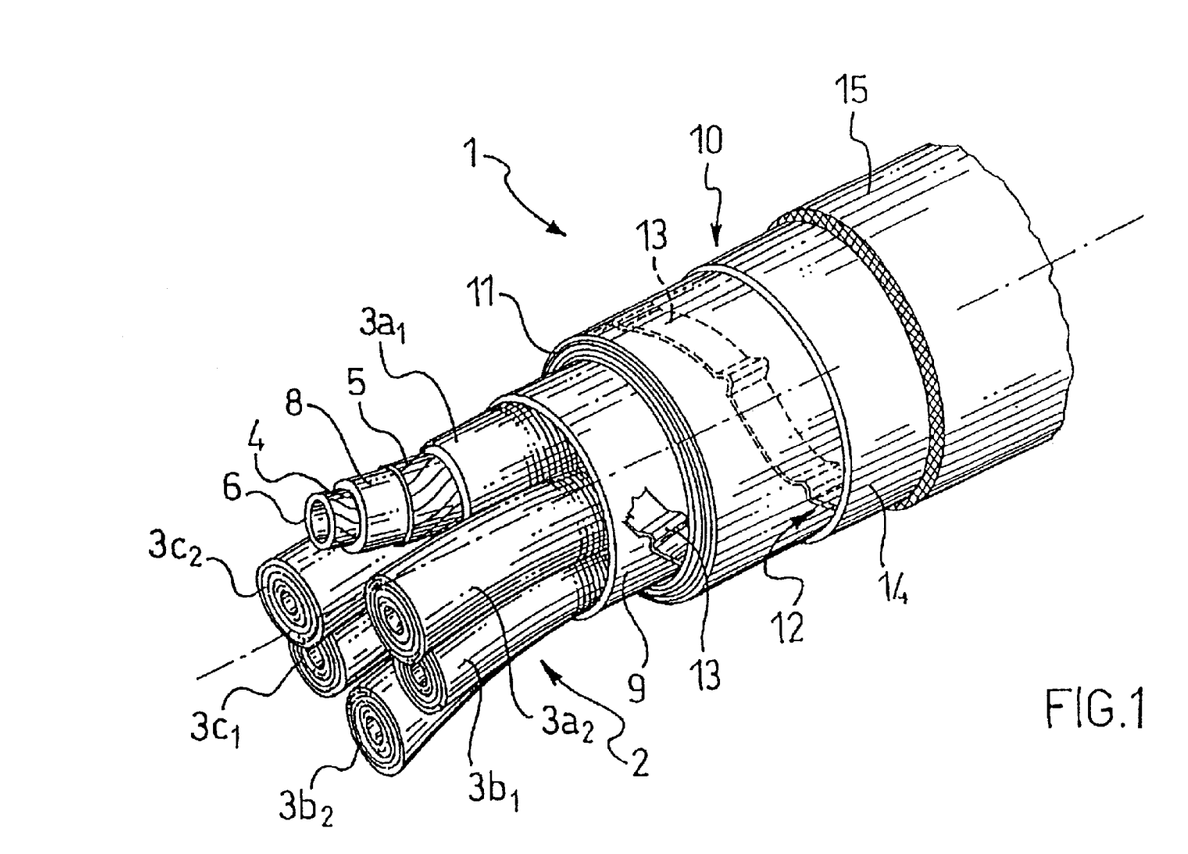
FIG. 1 shows a perspective view in partial cross-section, of a coaxial multielement triphase superconducting cable according to a first embodiment of the present invention.

With reference to FIG. 1, a coaxial triphase superconducting cable 1 according to the present invention comprises a superconducting core, globally indicated by 2, comprising a plurality of conductive elements 3, indicated by 3a, 3b, 3c for each phase, housed—preferably loosely—within a tubular containing shell 9, made e.g. of metal, such as steel, aluminum and the like.

Each of the conductive elements 3 comprises in turn a couple of coaxial conductors, respectively phase conductors 4 and return conductors 5, each including at least one layer of superconducting material, as will appear more clearly in the following.

The coaxial phase conductors 4 and neutral conductors 5 are electrically insulated from one another by interposing a layer 8 of dielectric material, onto which the return conductor 5 is directly supported.

The cable 1 also comprises a suitable cooling circuit for circulating a cooling fluid adapted to cool the superconducting core 2 to a temperature adequately lower than the critical temperature of the chosen superconducting material, which in the cable of FIG. 1 is of the so-called high-temperature type.

The aforementioned cooling circuit comprises suitable pumping means, known per se and therefore not shown, supplying a suitable cooling fluid, for instance liquid nitrogen at a temperature typically of from 65 to 90 K, both within each of the conductive elements 3 and within the interstices between such elements and the tubular shell 9.

In order to reduce as much as possible the thermal dissipations towards the external environment, the superconducting core 2 is enclosed in a containing structure or cryostat 10, comprising a thermal insulation, formed for instance by a plurality of superimposed layers, and at least one protection sheath.

A cryostat known in the art is described, for instance, in an article of IEEE TRANSACTIONS ON POWER DELIVERY, Vol. 7, nr. 4, October 1992, pp. 1745–1753.

More particularly, in the example shown, the cryostat 10 comprises a layer 11 of insulating material, formed, for instance, by several surface-metallized tapes (for instance some tens) made of a polyester resin, known in the art as "thermal superinsulator", loosely wound, with the possible help of interposed spacers 13. Such tapes are housed in an annular hollow space 12, delimited by a tubular element 14, in which a vacuum in the order of $10^{-2}$ N/m$^2$ is maintained by means of known apparatuses.

The supporting tubular element 14 made of metal is capable of providing the annular hollow space 12 with the desired fluid-tight characteristics, and is covered by an external sheath 15, for instance made of polyethylene.

Preferably, the supporting tubular metal element 14 is formed by a tape bent in tubular form and longitudinally welded, made of steel, copper, aluminum or the like, or by an extruded tube or the like If the flexibility requirements of the cable so suggest, element 14 may be corrugated.

In addition to the described elements, cable traction elements may also be present, axially or peripherally located according to the construction and use requirements of the same, to ensure the limitation of the mechanical stresses applied to the superconducting elements 3; such traction elements, not shown, may be formed, according to techniques well known in the art, by peripherally arranged metal reinforcements, for instance by roped steel wires, or by one or more axial metal ropes, or by reinforcements made of dielectric material, for instance aramidic fibers.

Several superconducting elements are present for each phase, in particular, as shown by way of example in FIG. 1, each phase (a, b, c) comprises two superconducting elements, respectively indicated by the subscripts 1, 2 for each of the three illustrated superconducting elements 3a, 3b, 3c, so that the current of each phase is split up among several conductors (two in the example shown).

Figure 2:
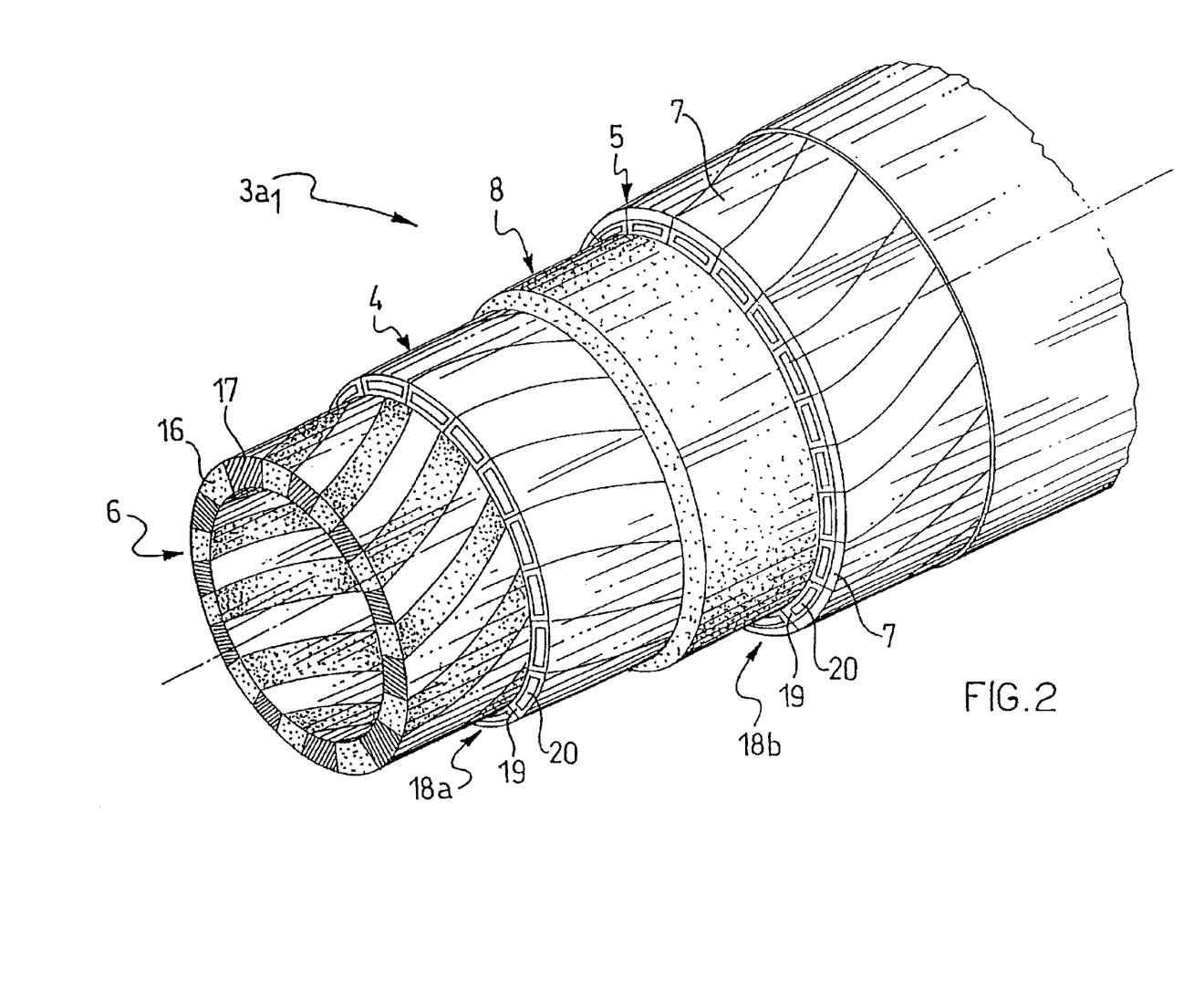
FIG. 2 shows a perspective view in an enlarged scale and in partial cross-section, of an element of the coaxial cable of preceding FIG. 1.

In FIG. 2 one of the conductive elements 3 of the coaxial superconducting cable 1 of the preceding FIG. 1 is shown in perspective and enlarged scale.

To make the description easier, in the present FIG. 2 and the following FIGS. 3 and 4, the elements of the cable structurally or functionally equivalent to those previously described with reference to FIG. 1 will be indicated by the same reference numbers and will be no longer discussed.

The conductor element 3a1, shown in FIG. 2, comprises a composite tubular element 6 including a plurality of annular sectors 16, 17 respectively made of plastics material, for example polytetrafluoroethylene, and of metallic material, for example copper, alternately arranged one after the other and spirally wound.

Each of the coaxial phase conductors 4 and return conductor 5 comprises a plurality of superconducting tapes 18a and 18b, respectively, spirally wound on the composite tubular element 6 and onto the layer 8 of dielectric material, respectively. Each of such superconducting tapes 18a, 18b comprises a layer of superconducting material 20 enclosed within a metallic coating 19.

The return conductor 5 further comprises a plurality of copper straps 7 acting as stabilizing metal, in electrical contact with the metallic coating 19 of the superconducting tapes 18b onto which they are wound in a way known per se.

Figure 3:
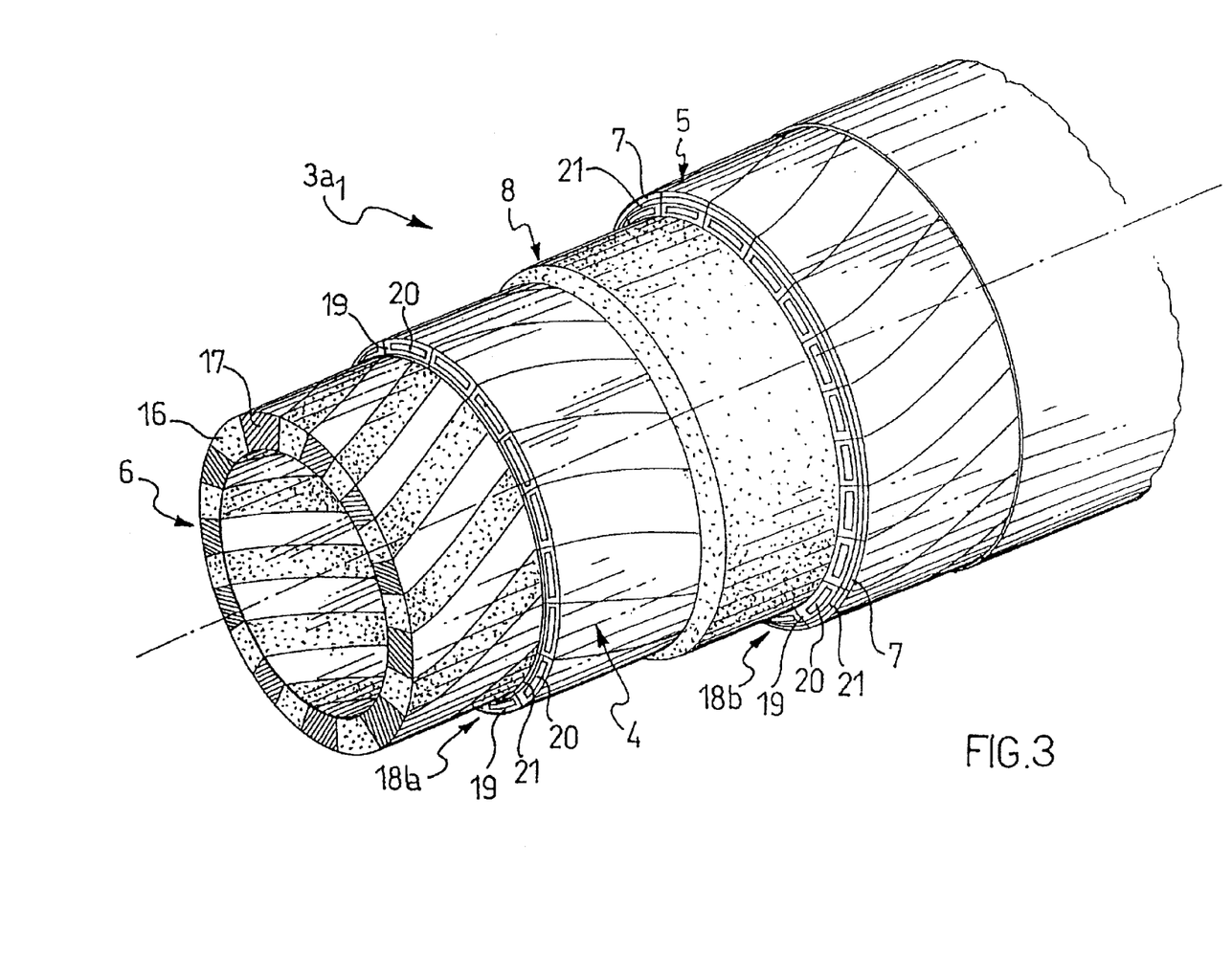
FIG. 3 shows a perspective view in an enlarged scale and in partial cross-section, of a second embodiment of an element of the coaxial cable of preceding FIG. 1, wherein both the phase conductor and the return conductor are provided with a reinforcing foil.

In the further embodiment of the conductive elements 3 of the cable 1 shown in FIG. 3, the coaxial phase conductor 4 and return conductor 5 further include a plurality of metallic reinforcing foils 21 coupled in a substantially irreversible way, for example by means of brazing, to the metallic coating 19 of the superconducting tapes 18a, 18b.

Preferably, the reinforcing foils 21 of the phase conductor 4 are coupled to a radially inner face of the metallic coating 19, so as to be interposed between the composite tubular element 6 and the tapes 18a and act in this way as elements of mechanical protection for the latter.

In such way, the foils 21 are in electrical contact both with the metallic coating 19 of the superconducting tapes 18a and with the annular sectors 17 of metallic material of the composite tubular element 6.

Preferably, the reinforcing foils 21 of the return conductor 5 are arranged in a mirror-like fashion with respect to those of the phase conductor 4, that is, they are coupled to a radially outer face of the metallic coating 19 of the tapes 18b, so as to be interposed between the copper straps 7 and the tapes and act in this way as elements of mechanical protection for the latter.

In this way, the foils 21 are in electrical contact both with the metallic coating 19 of the superconducting tapes 18b and with the stabilizing metal (copper straps 7).

Advantageously, furthermore, the reinforcing foils 21 of the coaxial phase conductor 4 and return conductor 5 contribute in this way both to ensure the cryostability of cable 1 in case of short circuit and to adequately reduce the tensile stresses applied to the terminals of cable 1 when the foils are coupled to the superconducting tapes 18a, 18b in such a way as to impart to the superconducting material a predetermined prestress degree.

Figure 4:
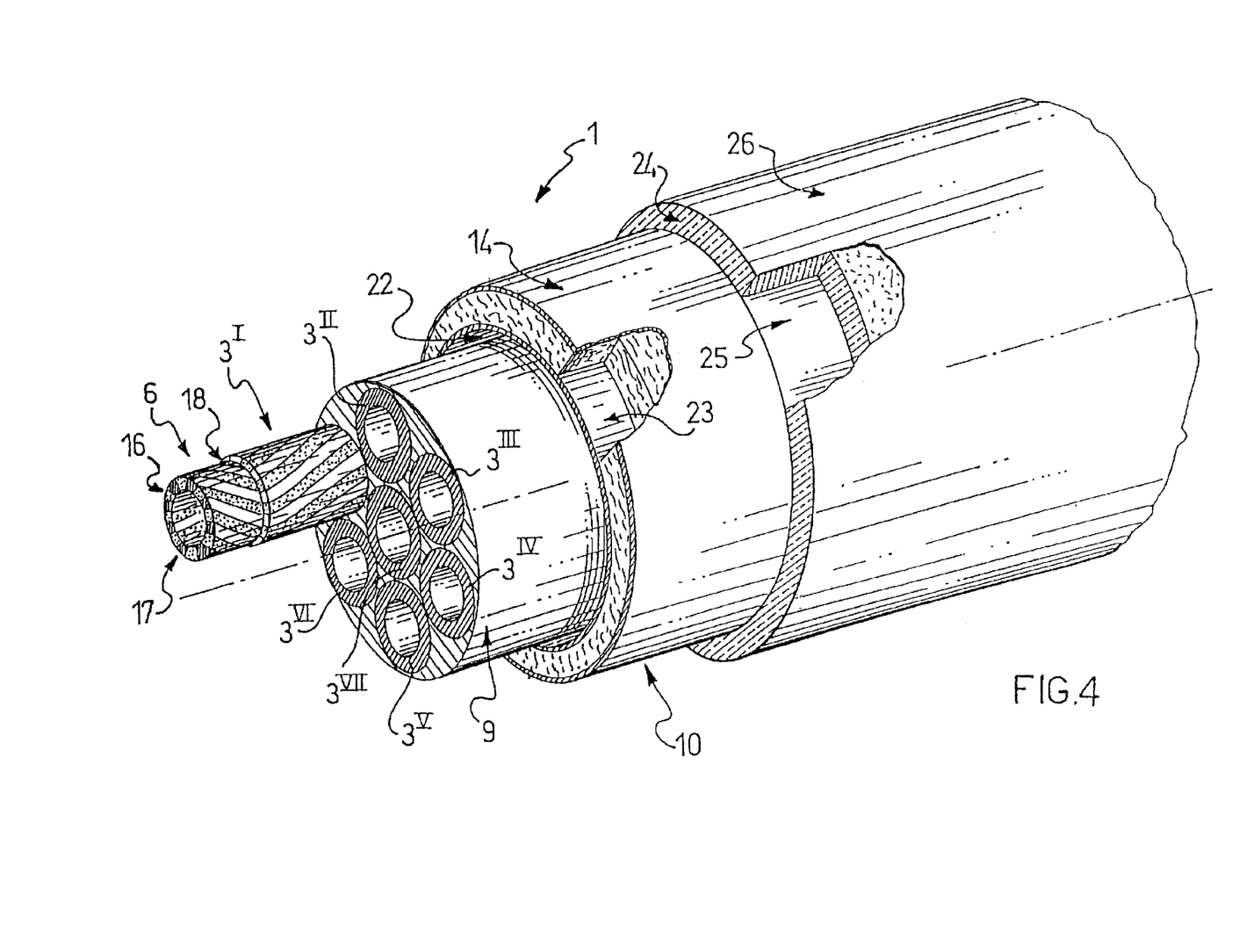
FIG. 4 shows a perspective view in an enlarged scale and in partial cross-section, of a monophase, multielement non-coaxial superconducting cable according to a further embodiment of the present invention.

In the embodiment shown in FIG. 4, that illustrates a non-coaxial and monophase superconducting cable 1, instead, the conductive elements $3^I$, $3^{II}$, ..., $3^{VII}$, only comprise the phase conductor 4 which, in this case, includes superconducting tapes 18 spirally wound on the composite supporting tubular element 6.

In this further embodiment, the cryostat 10 comprises a hollow space 22 in which liquid nitrogen circulates, defined between the tubular shell 9 and a supporting tubular element 23.

Externally to this non-coaxial monophase superconducting cable 1 a layer of dielectric material 24 is provided for the electrical insulation of the superconducting cable, incorporated within two tubular elements 25, 26 of semiconducting material.

With reference to what has been described hereinabove, some examples will be provided hereunder by way of non-limitative indication which illustrate the behavior in short circuit conditions as well as the mechanical stresses of some embodiments of the superconducting cables according to the invention and of cables according to the prior art.

EXAMPLE 1

Invention

According to an embodiment of the invention, a prototype of high power triphase coaxial superconducting cable was made of the high temperature and cold dielectric type, comprising a plurality of conductive elements each including a pair of phase and return conductors consisting of tapes of superconducting material spirally wound on respective supporting elements.

In particular, the phase conductor is supported by a tubular element entirely made of metal whereas the return conductor is supported by a layer of dielectric material external and coaxial to the phase conductor.

The superconducting tapes of both the phase and return conductors are provided with metallic reinforcing foils having a thickness of 0.05 mm, coupled to the metallic coating of the same tapes.

The return conductor is also provided with copper straps (stabilizing metal) in electrical contact with the metallic reinforcing foils coupled to the metallic coating of the superconducting tapes.

The coupling step of the reinforcing foil to the superconducting tapes was carried out by submitting, in a first step, the reinforcing foil to a tensile stress in a substantially longitudinal direction and coupling the same, in a second step, to the tapes in order to obtain a prestress of the superconducting material. In particular, the foil was submitted to a tensile stress of about $15.4*10^7$ Pa (15.7 kg/mm$^2$) thus obtaining a prestress degree of the superconducting material equal to about 0.1%.

The metal used for the supporting tubular element of the phase conductor was copper.

The working characteristics taken into consideration for the manufacture of the cable prototype were the following:

| | |
|---|---|
| power | 0.7 GVA |
| nominal voltage (phase—phase) | 132 kV |
| nominal current | 3070 A |
| critical current | 9210 A |
| length | 50 km |

The cable was designed in such a way as to be stable at the following short circuit conditions:

| | |
|---|---|
| short circuit current $I_{cc}$ | 50 kA |
| short circuit duration $\Delta t_{cc}$ | 0.5 s | further assuming:
1) that the power dissipated during the short circuit transient is wholly converted into a temperature increase of the layer of superconducting material, of the metallic coating that incorporates the superconducting material and of the metal in any way in electrical contact therewith (supporting tubular element, metallic reinforcing foil and copper straps), 2) that the dissipation is resistive with passage of all the short circuit current through the metallic material in electrical connection with the superconducting material, 3) to limit the maximum temperature reached by the superconducting at the end of the short circuit well below the maximum allowable temperature $T_{amm}$ defined as the minimum temperature between the critical temperature of the superconducting and the boiling temperature of the cooling fluid, at the minimum working pressure, assuming that the temperature increase $\Delta T$ due to the short circuit is given by the following relation:

$$\Delta T_{amm} \leq (T_{amm} - T_{working\ max})/f$$

wherein $T_{working\ max}$ is the maximum working temperature and f is the safety coefficient.

A cable made with the aforesaid working characteristics has the following working temperature and pressure ranges for the liquid nitrogen:

| | |
|---|---|
| minimum working temperature = | 63.2 K |
| maximum working temperature = | 82 K |
| maximum working pressure = | 20 bar |
| minimum working pressure = | 10 bar |

Assuming that a BSCCO type high temperature superconducting material is used, having a critical temperature of about 110 K, and since the boiling temperature of the liquid nitrogen at 10 bar pressure is equal to 104 K, the maximum allowable temperature $T_{max}$ will coincide with this value.

The determination of the amount of metallic material for ensuring the stability of the cable in conditions of short circuit was carried out according to the following equation:

$$\Delta T_{amm} = [(\Sigma R_i I_{cci}^2)/(\Sigma m_i c_{pi})] * \Delta t_{cc} \quad (I)$$

wherein:

$\Delta T_{amm}$ represents the allowable temperature increase due to short circuit, $R_i$ represents the resistance of the i-th element of the superconducting cable, $I_{cci}$ represents the short circuit current of the i-th element of the superconducting cable, $m_i$ represents the mass of the i-th element of the superconducting cable, $c_{pi}$ represents the specific heat of the i-th element of the superconducting cable, $\Delta t_{cc}$ represents the duration of the short circuit.

It results:

$$m_i = \delta_i * V_i = \delta_i * S_i * l_i \quad (II)$$

wherein:

$S_i$ represents the density of the i-th element, $V_i$ represents the volume of the i-th element, $S_i$ represents the cross section of the i-th element, $l_i$ represents the length of the i-th element.

It also results:

$$R_i = \rho_i * (l_i/S_i) \quad (III)$$

wherein $\rho_i$ represents the specific electric resistivity of the i-th element.

Since the value of $\Delta T_{amm}$, $S_i$, $l_i$, $\rho_i$, $I_{cci}$, $c_{pi}$, $\Delta t_{cc}$, as well as the cross sections of the superconducting tapes, of the metallic reinforcing foils and of the copper straps are known design data, by substituting the equation (II) and (III) in (I) it is possible to determine of the cross section of the metallic material of the supporting tubular element.

The structural characteristics of the cable made according to the aforesaid criterion of full and adiabatic stability and the temperature increase $\Delta T$ of the superconducting material in case of short circuit are reported in following Table I, with respect to the cases—indicated by 1a and 1b —obtained assuming that the safety coefficient f is equal to 4.4 and 2.2 respectively.

In particular, only the structural characteristics of the phase conductor are reported, since the structural characteristics of the return conductor may be determined in a quite similar way, in view of the fact that the same short circuit current passes through both of them.

As it may be noticed from such Table, the cable according to the invention allows to limit to 5° C. (case 1a) and 10° C. (case 1b), respectively, the temperature increase $\Delta T$ of the superconducting material in case of short circuit, thus fully complying with the criterion of full and adiabatic stability of the cable.

EXAMPLES 2–3

Invention

According to further embodiments of the invention, two further prototypes of coaxial cable were made, comprising 3 conductive elements, each including a pair of phase and return conductors consisting of tapes of superconducting material spirally wound on a respective supporting element, in this case consisting of a composite tubular element for the phase conductor and of the layer of dielectric material for the return conductor.

In particular, the composite supporting tubular element was made with annular sectors made of copper (first metallic material) and polytetrafluoroethylene, alternately arranged one after the other and having an inner diameter equal to 38.7 mm and an outer diameter equal to 48.5 mm, essentially in order to comply with engineering and cooling constraints. The preferred number of annular sectors for such arrangement has been found equal to 14. The cross-sectional area of the single sector is equal to 47.9 mm².

Similarly to the case of preceding Example 1, the return conductor was provided with copper straps (stabilizing metal) in electrical contact with the superconducting tapes.

The superconducting tapes were provided with a metallic reinforcing foil coupled to the metallic coating of the superconducting tapes analogous to that of Example 1 (Example 2) or were not provided with such foil (Example 3).

Furthermore, similarly to the case of preceding Example 1, the coupling step of the reinforcing foil to the superconducting tapes was carried out by submitting, in a first step, the reinforcing foil to a tensile stress in substantially longitudinal direction and coupling the same, in a second step, to the tapes in such a way as to obtain a prestress of the superconducting material.

In particular, the foil was submitted to a tensile stress of about $15.4*10^7$ Pa ($15.7$ Kg/mm²) obtaining a prestress level of the superconducting material equal to about 0.1%.

The structural characteristics of the two cable prototypes are reported in the following Table I.

By analyzing the data of the aforesaid Table I, in case the maximum allowable temperature increase is 10° C., Examples 2 and 3 provide the same results of Example 1b, in that the contribution of the reinforcing foil of the tapes of superconducting material was found to be negligible with respect to the temperature increase.

AS to the cable geometry, it turns out that the composite tubular element of Examples 2 and 3 has a higher thickness than the entirely metallic tubular element of the cable of Example 1b, due to the need of providing a suitable amount of copper for assuring the stability of the cable in conditions of short circuit in the presence of a suitable amount of polytetrafluoroethylene.

EXAMPLE 4

Comparison

A cable having the same characteristics of preceding Example 1 was made, however designing the same without taking into account any stability criterion during the short circuit transient. The results obtained are reported in following Table II.

EXAMPLE 5

Comparison

Still with the purpose of making a comparison, a cable was made having the same characteristics of preceding Example 1, except for the absence of the reinforcing foil externally to the tapes of superconducting material, by adopting the criterion of full and adiabatic stability.

In the above mentioned publication of E. W. Collings, "Flux-jump stability and cryostability in ceramic superconductors for 80K", MRS Int'l Mtg. on Adv. Mats. Vol. 6, 1989 Materials Research Society, an equation is reported that correlates the ratio "Rs" between the sum of the areas of the stabilizing metal and of the metal of the metallic coating of the superconducting tapes and the total area of the superconducting material only to parameters such as the electric resistivity $\rho$ of the stabilizing metal and the critical current density $J_c$ of the superconducting tapes.

Substituting those values, the above mentioned equation becomes:

$$R_s^2 * (R_s + 1) = 9.27 * I_c \quad \text{(IV)}$$

Knowing the ratio between the area of the metallic coating of the superconducting tape and the total area of the superconducting material, it is possible to obtain the value of the ratio between the area of the stabilizing metal and that of the superconducting material.

The results are reported in the same Table II.

EXAMPLE 6

Comparison

A cable was made according only to constructive and/or technological requirements, that is with the additional metal having only the function of supporting the phase conductor and of protecting the return conductor.

The results obtained are reported in the following Table II.

EXAMPLE 7

Comparison

With the same procedures of preceding Example 4, two cables 7a and 7b were made wherein, as a consequence of the increase of only the amount of superconducting material, the safety margin was assumed equal to 4.4 and 2.2 respectively.

The results are reported in the same Table II.

By analyzing the following Tables I and II; it turns out that the cables made according to Examples 4 and 6 are not suitable for practical applications, because of a too high temperature increase ($\Delta T$) in case of short circuit.

Instead, the cables made according to Examples 1–3 guarantee the stability of the superconducting material at high temperature and to maintain nitrogen in liquid phase with an overall amount of metallic material in electrical connection with the superconducting material lower than the cable of Example 5 and with an amount of superconducting material lower than the cables 7a and 7b of Example 7, with an ensuing economical saving.

EXAMPLE 8

Evaluation of Mechanical Stresses

In order to compare the mechanical stresses induced along a longitudinal direction in the superconducting material as a consequence of its cooling by means of liquid nitrogen in the operating arrangement with clamped heads, cable prototypes according to Examples 1b, 2 and 3 were compared with the cable of Example 5.

A minimum total cross-sectional area of metallic material equal to 298.2 mm$^2$ for the full and adiabatic stability in short circuit conditions was assumed.

Copper was used as first metallic material for manufacturing the tubular composite supporting elements, whereas polytetrafluoroethylene was used as second non metallic material.

The supporting tubular element of Examples 1b and 5 was made with metal sectors, in particular with copper sectors, in a number equal to 14 in such a way as to geometrically obtain the same structure of the composite supporting tubular elements of Examples 2 and 3.

The prototypes were then submitted to a number of tests that allowed to evaluate the deformations generated in the superconducting material, the traction force applied by the cable to the terminals as a reaction to the constrained shrinkage, and finally the amount of conducting material used compared to that necessary to ensure the full and adiabatic stability of the cable according to the above described criteria.

The results of such tests are reported in the following Table III, wherein the value of the critical deformation is also reported, that is the value of deformation above which fractures and grain separation of the superconducting material were detected, with an ensuing decrease of the current transport capacity of the material itself.

With respect to the value of critical deformation, it is immediately clear from the values of Table III that the cables provided with reinforcing foil, Examples 1b and 2, have a greater value than the cables not provided with such foil; this may be substantially ascribed to the prestress effect of the layer of superconducting material consequent to the coupling step of the foil to the metallic coating of the tapes.

From the results of Table III, it is further possible to observe that, for the cable of Example 5 the deformation of the superconducting material has a greater value than the critical one, and this would affect the capacity of the superconducting of transmitting current in superconductivity conditions.

Advantageously, instead, in both prototypes of Examples 2 and 3 the deformations which the superconducting material is submitted to, besides being substantially lower than the critical value, are also clearly lower than those detected for the prototype of Example 1b, as an additional proof of the effectiveness of the composite supporting tubular element in reducing the magnitude of the stresses along a longitudinal direction imparted to the superconducting material.

TABLE I

INVENTION

|  |  | metallic material of the supporting tubular element | internal SC | ΔT (° C.) |
|---|---|---|---|---|
| Ex. 1a | sect. mm² | 545 | 88.6 | 5 |
|  | Cu/SC | 5.6 |  |  |
| Ex. 1b | sect. mm² | 335 | 88.6 | 10 |
|  | Cu/SC | 3.8 |  |  |
| Ex. 2 | sect. mm² | 335 | 88.6 | 10 |
|  | Cu/SC | 3.8 |  |  |
| Ex. 3 | sect. mm² | 335 | 88.6 |  |
|  | Cu/SC | 3.8 |  |  |

Internal SC = layer of superconducting material of the internal conductor (phase conductor)
ΔT = temperature increase of the superconducting material.

TABLE II

COMPARISON

|  |  | metallic material of the supporting tubular element | internal SC | ΔT (° C.) |
|---|---|---|---|---|
| Ex. 4 | sect. mm² | 0 | 88.6 | 620 |
|  | Cu/SC | — |  |  |
| Ex. 5 | sect. mm² | 1277.7 | 29.2 | 0 |
|  | Cu/SC | 43.7 |  |  |
| Ex. 6 | sect. mm² | 199 | 88.6 | 23.7 |
|  | Cu/SC | 2.2 |  |  |
| Ex. 7a | sect. mm² | 199 | 615 | 5 |
|  | Cu/SC | 0.32 |  |  |
| Ex. 7b | sect. mm² | 199 | 320 | 10 |
|  | Cu/SC | 0.62 |  |  |

Internal SC = layer of superconducting material of the internal conductor (phase conductor)
ΔT = temperature increase of the superconducting material.

TABLE III

|  | Ex. 1b | Ex. 2 | Ex. 3 | Ex. 5 |
|---|---|---|---|---|
| deformations on superconductors (%) | 0.31 | 0.18 | 0.18 | 0.31 |
| critical deformation (%) | 0.5 | 0.5 | 0.29 | 0.29 |
| traction forces (Kg) | 11700 | 14100 | 13700 | 40000 |
| copper amount (%) | 100 | 100 | 100 | 300 |

What is claimed is:

1. A superconducting cable having at least one phase comprising:
   a layer of tapes comprising superconducting material;
   a tubular element for supporting said layer of tapes, said tubular element comprising at least one portion made of metallic material and being in electrical contact with the layer of tapes;
   a cooling circuit configured to cool the layer of tapes to a working temperature not higher than the critical temperature of the tapes, the cooling circuit comprising a fluid at a predetermined working pressure ranging between a minimum value and a maximum value, wherein deformation of the layer of tapes consequent to a temperature variation between room temperature and the working temperature is lower than critical deformation of the layer of tapes; and
   a predetermined amount of conductive material of resistive type in electrical contact with the layer of tapes, the conductive material being configured to cause a maximum temperature reached by the layer of tapes in case of a short circuit to be lower than the lesser of the critical temperature of the superconducting material comprising the layer of tapes and the boiling temperature of said cooling fluid at a minimum working pressure of said fluid wherein said tubular element is a composite and comprises a first metallic material and a second material associated to said first material and having a thermal expansion coefficient higher than that of said first material.

2. A superconducting cable according to claim 1, wherein said layer of tapes is incorporated within a metallic coating.

3. A superconducting cable according to claim 2, wherein said superconducting material comprises at least one reinforcing foil made of metallic material.

4. A superconducting cable according to claim 3, wherein said superconducting material comprises two reinforcing foils made of metallic material coupled to opposite faces of said layer.

5. A superconducting cable according to claim 4, wherein the reinforcing foil and the metallic coating of said tapes comprising superconducting material is a metal selected from the group consisting of copper, aluminum, silver, magnesium, nickel, bronze, stainless steel, beryllium, and alloys thereof.

6. A superconducting cable according to claim 3 or 4, wherein said superconducting material is essentially pre-stressed along a longitudinal direction.

7. A superconducting cable according to claim 6, wherein the layer of superconducting material of said at least one tape comprising superconductive material has a pre-stress degree along a longitudinal direction ($\gamma$) of between 0.05 and 0.2%.

8. A superconducting cable according to claim 6, wherein the reinforcing foil and the metallic coating of said tapes comprising superconducting material is a metal selected from the group consisting of copper, aluminum, silver, magnesium, nickel, bronze, stainless steel, beryllium, and alloys thereof.

9. A superconducting cable according to claim 1, wherein the cable comprises a plurality of tapes comprising superconducting material spirally wound on the surface of said at least one supporting tubular element, said tapes having winding angles of between 5° and 60°.

10. A superconducting cable according to claim 1, wherein said first and second materials are formed as adjacent annular sectors.

11. A superconducting cable according to claim 10, wherein said annular sectors are arranged one after the other.

12. A superconducting cable according to claim 10, wherein said annular sectors are spirally wound according to a winding angle of between 5° and 50°.

13. A superconducting cable according to claim 1, wherein said first metallic material is a metal having a resistivity of 77 K$<5*10^{-9}$ $\Omega$m, a specific heat at 77 K$>10^6$ J/m³K and a heat conductivity at 77 K$>5$ W/mK.

14. A superconducting cable according to claim 1, wherein said second material is a non metallic material having a thermal expansion coefficient higher than $17*10^{-6}$ C.$^{-1}$.

15. A superconducting cable according to claim 14, wherein said second non metallic material is a plastic material selected from the group consisting of polyamide, polytetrafluoroethylene and polyethylene.

16. A conductive element for superconducting cables comprising at least one layer of superconducting material incorporated within a metallic coating supported by a tubular element comprising a predetermined amount of metallic material with which the layer is in electrical contact, said layer of superconducting material being cooled by means of a cooling fluid to a temperature not higher than the critical temperature of the layer, wherein a predetermined amount of conducting material of resistive type is present in electrical contact with the layer of superconducting material, such that a maximum temperature reached by the at least one layer of superconducting material in case of short circuit is lower than the lesser of the critical temperature of the at least one layer of superconducting material and the boiling temperature of said cooling fluid at a minimum working pressure of said fluid wherein said tubular element is a composite and comprises a first metallic material and a second material associated to said first material and having a thermal expansion coefficient higher than that of said first material.

* * * * *